Patented June 10, 1930

1,762,937

UNITED STATES PATENT OFFICE

CYRIL J. STAUD, OF ROCHESTER, NEW YORK, ASSIGNOR TO EASTMAN KODAK COMPANY, OF ROCHESTER, NEW YORK, A CORPORATION OF NEW YORK

PROCESS OF SPRAY-DRYING CELLULOSE ACETATE SOLUTIONS

No Drawing.   Application filed March 2, 1928. Serial No. 258,689.

This invention relates to spray-drying of cellulose acetate solutions,—especially those containing acetic acid. One object of the invention is to provide a spray-drying process for converting such solutions into a powder of special form which has the maximum surface relative to its weight, so that it is particularly suitable for fluid treatment, said process permitting, at the same time, an easy recovery of acetic acid and the other volatile ingredients from said solution. Other objects will hereinafter appear.

I have found that the desired objects can be obtained by including in the solution, along with the cellulose acetate and acetic acid, an organic liquid of high volatility (relative to water, for example), such as ethylene dichlorid, such solution being spray-dried, as described in U. S. Patent No. 1,516,225, Webb, Nobember 18, 1924. The presence of this volatile liquid causes the particles to present a jagged broken outer surface, the violent evolution of the volatile liquid during the drying operation causing a condition in the particles roughly analogous to the puffing action of the steam in puffed cereals. In other words, not only are the particles individually very small, relative to those usually obtained by spray-drying acetate reaction mixtures, but these individual particles are particularly permeable to treating liquids, such as hydrolyzing baths and washing baths.

I shall now describe one way of carrying out my invention, for purposes of illustration, but it will be understood that the invention is not limited to the details thus given, except as indicated in the appended claims. 100 parts by weight of cellulosic material, say purified and bleached cotton fibers, for example, are immersed for three and one-half hours at a temperature between 20° C. and 40° C., say 35° C., with 600 parts by weight of glacial acetic acid mixed with .18 parts by weight of sulfuric acid and 5.4 parts by weight of ortho phosphoric acid. At the end of the above mentioned time, the excess of liquid is removed by pressure so that the weight of acetic acid in the press-cake is substantially equal to the weight of the cellulosic material. The press-cake is then thoroughly mixed up with 248 parts by weight of actual acetic anhydrid and 400 to 600 parts by weight of ethylene dichlorid. If the mixture heats too much, it should be restrained, and the mixing can, therefore, be most conveniently done in a reaction vessel provided with cooled walls. Good results are obtained by keeping the reaction mass between 33° C. and 55° C. with agitation until a clear flowable dope is obtained. Then there is thoroughly mixed in the dope about 400 parts by weight more of ethylene dichlorid.

This dope, after being filtered, if necessary, is then spray-dried in accordance with the process described in detail in the above cited Webb patent. The above described reaction dope is blown, under considerable pressure, through a nozzle into a fine spray or mist which comes into intimate contact with a current of warm, dry air, acting as a desiccating vehicle. The acetic acid and ethylene dichlorid evaporate very rapidly from the particles of the mist, leaving the latter as a powder, having the "puffed" characteristics hereinabove described.

In the above example, instead of adding 400 parts of ethylene dichlorid at the close of the reaction, I may add 1000 parts by weight of this originally. My process is applicable to the spray-drying of cellulose acetate reaction dopes or mixtures at the several stages of manufacture. In the above example, for instance, my process is carried out when the cellulose acetate has reached the chloroform-soluble stage. It may, however, be carried out when the reaction mixture is in the form of a flowable dope containing acetone-soluble cellulose acetate dissolved in a mixture containing acetic acid. In such a case, I add a volume of ethylene dichlorid to the dope, equal to the volume of the latter,—in other words, doubling the volume of the dope by the addition of ethylene dichlorid. I may likewise obtain chloroform-soluble cellulose acetate by any of the known methods which produce a solution in acetic acid, and then dilute said dope with an equal volume of ethylene dichlorid. When all of these mixtures containing the volatile organic liquid are spray-dried, the finely divided and broken-surfaced particles are obtained. The more ethylene dichlorid used, the finer the rough-surfaced particles. For example, instead of adding an equal volume of the ethylene dichlorid to a reaction dope before spray-drying, I may add twice as much ethylene dichlorid as the volume of dope, thus making the final mixture for spray-drying equal to three times the volume of the original.

Ethylene dichlorid can be replaced by other organic liquids miscible with acetic acid and cellulose acetate in the dopes, such as ethylene trichlorid and even chloroform. But I prefer to use ethylene dichlorid, because it is so readily separable from the acetic acid with which it is recovered in the spray-drying process. It can be fractionally distilled away, and in doing so, will dehydrate the acetic acid.

Having thus described my invention, what I claim as new and desire to secure by Letters Patent is:

1. In the process of preparing cellulose acetate, spraying in fine droplets a flowable reaction mixture comprising cellulose acetate, acetic acid and an organic liquid which is miscible therewith and highly volatile, into a desiccating gaseous vehicle which takes up vapors of acetic acid and of said liquid with great rapidity thereby disrupting the particles and converting the spray into a fine power the particles of which are rough surfaced and highly permeable to liquids.

2. In the process of preparing cellulose acetate, atomizing a flowable solution of cellulose acetate in acetic acid and ethylene dichlorid into a desiccating gaseous vehicle which takes up vapors of acetic acid and ethylene dichlorid with great rapidity, thereby disrupting the particles and converting them into a fine powder the particles of which are rough surfaced and highly permeable to liquids.

3. In the process of preparing cellulose acetate, atomizing flowable solution of cellulose acetate in acetic acid and ethylene dichlorid into a desiccating gaseous vehicle which takes up vapors of acetic acid and ethylene dichlorid with great rapidity, thereby disrupting the particles and converting them into a fine powder the particles of which are rough surfaced and highly permeable to liquids, separating said vapor-laden gaseous vehicle from said powder and recovering said acid and said dichlorid from said vehicle.

Signed at Rochester, New York, this 27th day of Feb. 1928.

CYRIL J. STAUD.